United States Patent [19]

Vasile

[11] 4,274,203
[45] Jun. 23, 1981

[54] LEVEL DEVICE

[76] Inventor: Anthony J. Vasile, 68 Grandview Ave., Monsey, N.Y. 10952

[21] Appl. No.: 78,172

[22] Filed: Sep. 24, 1979

[51] Int. Cl.³ .......................... G01B 3/10; G01B 11/00
[52] U.S. Cl. .................................... 33/1 LE; 33/1 H;
33/274; 33/292; 33/339; 33/413
[58] Field of Search ................. 33/1 H, 274, 292, 339,
33/275 R, 1 LE, 413, 286, 268

[56] References Cited

U.S. PATENT DOCUMENTS

| | | |
|---|---|---|
| 918,869 | 4/1909 | Larsen . |
| 1,400,626 | 12/1921 | Rodriguez . |
| 1,448,931 | 3/1923 | Manning .............................. 33/1 LE |
| 2,198,836 | 4/1940 | Patton .................................... 33/286 |
| 2,627,115 | 2/1953 | Pippin . |
| 2,746,164 | 5/1956 | Eitzen . |
| 2,753,633 | 7/1956 | Calver .................................... 33/1 H |
| 2,807,887 | 10/1957 | Webb . |
| 2,942,348 | 6/1960 | Caruso . |
| 3,242,578 | 3/1966 | Moll . |
| 3,335,498 | 8/1967 | Barbee . |
| 3,568,322 | 3/1971 | Showers ............................ 33/413 X |
| 4,067,117 | 1/1978 | Bernard . |

*Primary Examiner*—William D. Martin, Jr.
*Attorney, Agent, or Firm*—Posnack, Roberts, Cohen & Spiecens

[57] ABSTRACT

A measuring apparatus in which two casings are connected together each housing a coiled measuring means adapted for being selectively un-coiled and withdrawn from the casing or recoiled and retracted into the casing. A sighting device is provided on one of the casings to sight a target. The sighting means includes a level for determining when the sighting device is sighting along a horizontal line and a second level is provided to indicate when the casings are also appropriately arranged relative to a vertical line perpendicular to the first said horizontal line. Triggers are provided for the two coiled measuring devices and a brake is provided for each of the measuring devices. A digital display is employed and a counting circuit is provided for indicating the amount of measuring means which is uncoiled from the two respective casings. An alarm is provided to indicate when the unwound measuring devices are off line relative to the sighting device.

19 Claims, 12 Drawing Figures

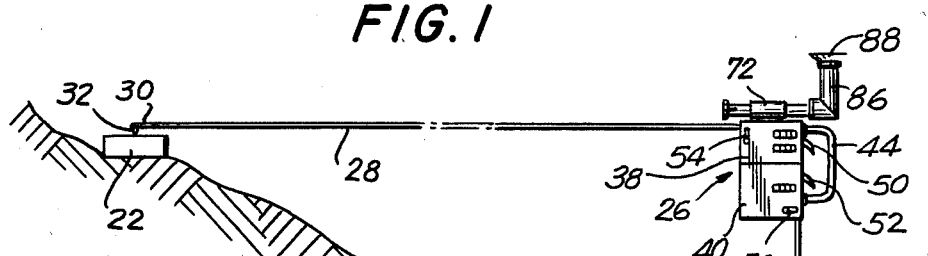
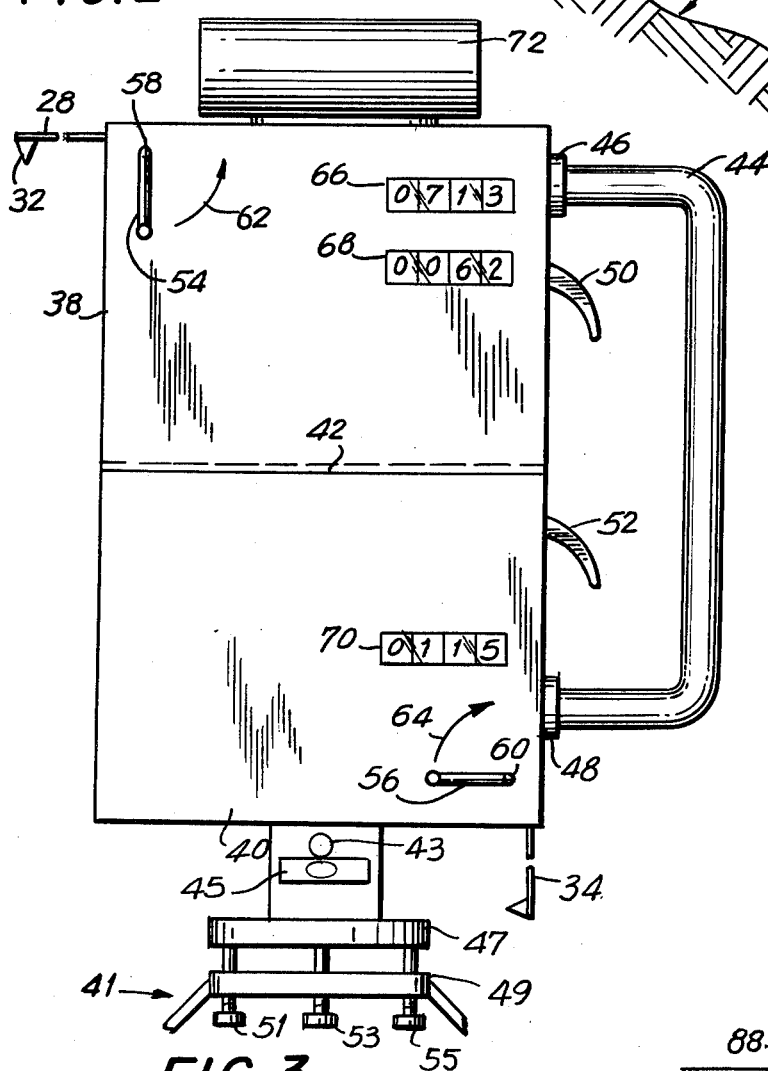
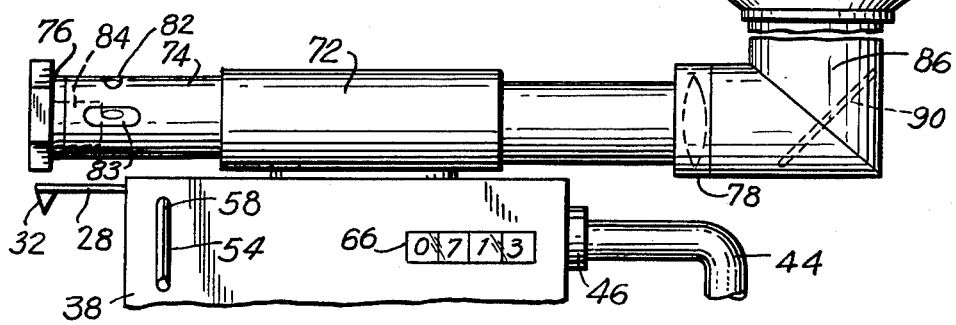
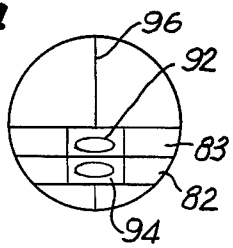
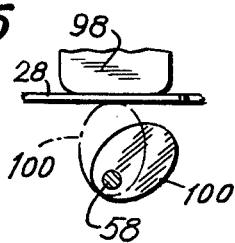
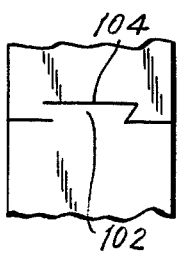

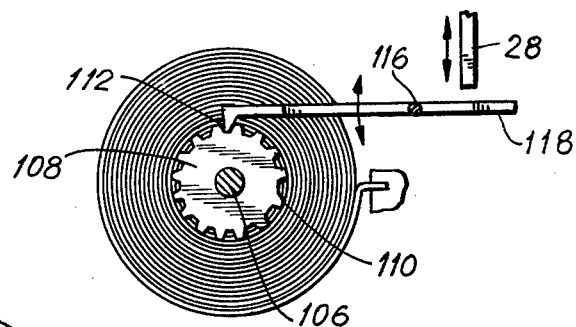
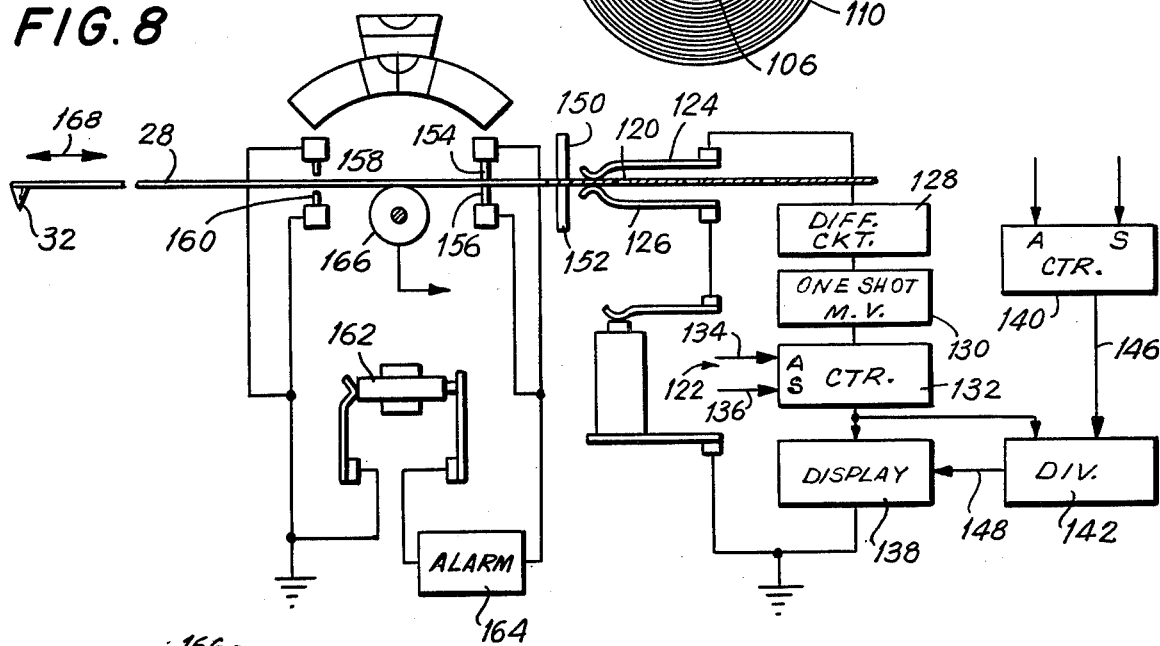
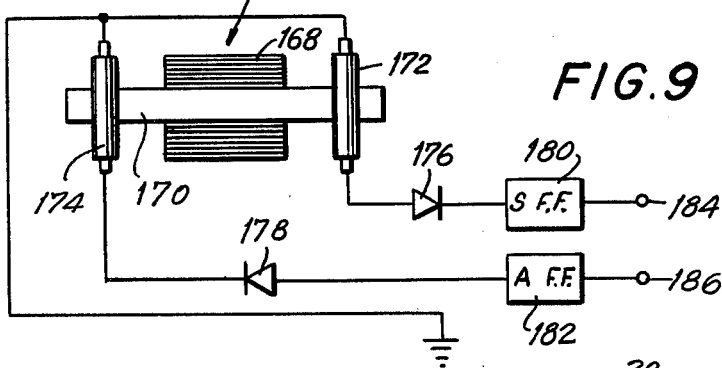
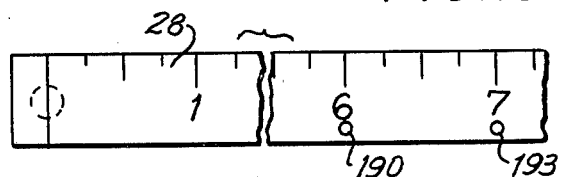
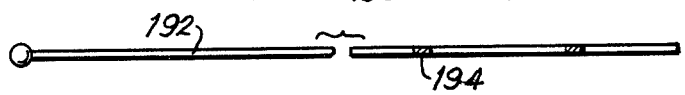
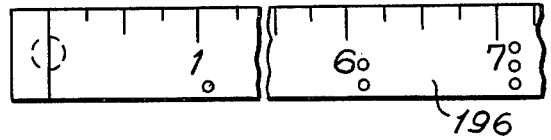

LEVEL DEVICE

THE INVENTION

This invention relates to grade determining devices and to level devices and more particularly to combinations of measuring devices and level devices which enable the determination of grade or slope as well as the determination of measurements of length and height and the like.

BACKGROUND

A level is an instrument used by carpenters, masons, surveyors, builders and the like to tell when a surface is level or horizontal to the earth or to tell more particularly when a measuring device is appropriately aligned to take horizontal or vertical measurements.

One of the most accurate levels which has been employed is called the spirit level which is simply a glass tube filled with a liquid and containing a bubble of air. The center of the tube may be slightly curved so that when the level is held horizontal the center is the highest point to which the bubble rises in order to indicate an appropriate horizontal attitude.

One of the most important tools used by surveyors is known as a transit. This involves the use of a small telescope set up on a tripod and to which are attached horizontal and vertical measuring instruments adapted for the measurements of horizontal and vertical angles. The tripod and the telescope may be related to the horizontal by the aid of attached spirit levels such as mentioned hereinabove. A weight hanging down from the tripode may indicate the exact spot where the surveying instrument is set up.

There has been many patents directed to the above-indicated types of tools. For example, C. Larsen, in U.S. Pat. No. 918,869 discloses a clinometer comprising a graduated rod with a level and a tape line casing slidable thereon. A tape line is provided in the casing and a plumb bob is secured upon the end of the tape line. Readings taken from the rod and tape line will furnish the general inclination or slope of the ground between two spaced points.

Lester Pippin in U.S. Pat. No. 2,627,115 relates to instruments used by surveyors for measuring the height of a grade or sloping surface or fill wherein a vertically positioned measuring stick extends through a horizontally disposed bar having a spirit level therein wherein with the stick standing on a grade and the bar held in a level position with one end on the grade and the other on the stick the height of that point is indicated on the stick. Pippin indicates that in measuring elevations it is difficult to measure the height of the soil of ground without a surveyor's leveling instrument. Moreover, he states that in numerous instances particularly in making fills for roadways and in grading fields on farms and the like it is desirable to ascertain the depth without the necessity of resorting to surveyor's instruments. With this in mind the invention was directed to a device including a pair of telescoping rods or sticks with a spirit level in one member and with units of measure indicated on the other whereby with the member on which the units of measure are provided held in a vertical position and the member with the spirit level held horizontal the depth of a sloping surface may be readily determined.

Sherman Calver in U.S. Pat. No. 2,753,633 provides an improved slope gauge device for establishing grades either in cut or fill in earth-work operations, the device being adapted to enable a combination of different slope angles to be set up in a rapid and simple manner. The Calver apparatus is a slope gauge which comprises a calibrated vertical arm formed with apertures spaced along its length, a calibrated horizontal arm formed with apertures spaced along its length, both extending through and pivotally connecting the horizontal arm to the vertical arm at selected of the apertures, an inclined strut bar formed along its length with spaced apertures and bolts extending through selected apertures of the strut bar and apertures in the arms, there being furthermore provided a clamp detachably secured to one of the arms for engaging a stake, and a bubble level mounted on the horizontal arm.

Ray Bernard in U.S. Pat. No. 4,067,117 discloses a spirit level having a measuring stick slidably mounted on one end of the level with means attached to the level for clamping and releasing the free transverse movement of the measuring stick from a position near the center of the level. A separate bracket is provided for attachment to the level for the clamping device which bracket also includes a guide for the measuring stick. The clamping device includes a spring urged frictional brake which engages the measuring stick and is releasable by a thumb operated handle slidably mounted adjacent a vial which indicates when the level is horizontal. The guiding bracket may be longitudinally extended with respect to the level to increase the length thereof.

William Eitzen in U.S. Pat. No. 2,746,164 disloses an invention which relates to carpenters' or builders' levels and has the object of providing a readily attachable or removable grade or slope measuring device on one end of a level so that the grade may be immediately read in desired linear units. In this apparatus a rule can be locked in downwardly extended position relative to a level by movement imparted by a pinion. Knowing the length of the level, an operator can read the grade of the slope from the rule by noting the linear distance shown by an indicator in linear units.

Boyd Barbee in U.S. Pat. No. 3,335,498 discloses an invention which relates to a carpenter's measuring tool of the type to be utilized to perform a variety of functions. The object of the Barbee invention is to provide a carpenter's measuring tool of T-square configuration in which the shank is movable along the crossbar to increase the effective length of the crossbar such that a perpendicular longer than half the length of the crossbar may be drawn.

James Webb in U.S. Pat. No. 2,807,887 provides in combination with a flexible measuring tape having scaled indicia on one face thereof a level indicating device which comprises a body including a plate having a ledge transversely across one face and intermediate the ends thereof to provide a support for one edge of the tape. Further a clamp carried by the body releasably secures the level indicating device on the tape at a selected location therealong, a weighted level indicator carried by the body for free movement is an arcuate path about an axis adjacent one end of the body and perpendicular to the longitudinal axis of the tape being moreover provided. The indicator includes a free pointed end defining an indexing pointer arranged below and adjacent said ledge to cooperate with the scaled indicia on the tape to show any deviation of the tape from a horizontally extending position.

Joseph Caruso in U.S. Pat. No. 2,942,348 shows a combination tape case and leveling device in which a coiled measuring tape is housed in a casing in which is installed a leveling device.

Alphonse Rodriguez in U.S. Pat. No. 1,400,626 and Oswin Moll in U.S. Pat. No. 3,242,578 show additional devices involving features which are employed in the present invention. Specific reference is made to U.S. Pat. No. 3,242,578 in which two level devices arranged at right angles to each other are employed.

All the above devices show many of the features collectively involved in constructing an apparatus in accordance with the present invention. However, none of the prior art patents show all of the features nor the advantageous results obtained in combining the various features in a single operative apparatus suitable for determining grades and making other related measurements.

SUMMARY OF THE INVENTION

It is an object of the invention to provide an improved grade determining apparatus.

Yet another object of the invention is to provide an improved measuring apparatus employing leveling devices.

Still another object of the invention is to provide an improved leveling device which is convenient to use and which occupies a relatively small space for purposes of storage and which is economically manufactured by the use of mass production techniques.

In achieving the above and other objects of the invention, there is provided a measuring apparatus comprising a casing, a coiled measuring means within said casing, and adapted for being selectively un-coiled and withdrawn from said casing and recoiled and retracted into said casing, and sighting means on said casing to sight a target, said sighting means including level means for determining when said sighting means is sighting along a horizontal line.

According to a further aspect of the invention, a second coiled measuring means is operatively associated with the first said coiled measuring means and adapted for being uncoiled and recoiled in a direction generally perpendicular to that of the first said coiled measuring means.

In further accordance with the invention, the aforesaid sighting means includes level means for indicating level along a line perpendicular to said horizontal line whereby to establish a reference for said second measuring means. According to a further feature of the invention, the aforesaid sighting means may be detachably supported on the casing to which it is attached.

Another feature of the invention provides for trigger means for releasing the coiled measuring means so that the latter can be coiled or uncoiled. A further feature of the invention provides for the use of periscope means on the sighting means whereby the sighting means can be viewed by looking vertically downwards.

According to yet another aspect of the invention, a braking device is provided for locking the measuring means against withdrawal. According to still a further aspect of the invention, two casings are provided for respectively housing the coiled measuring means, the casings being engaged together so that the two measuring means rotate about spaced and parallel axes and are released in generally perpendicular directions.

A further feature of the invention comprises the employing of measuring unit indicators on the measuring means with counting means being employed to count these indicators. According to still a further feature of the invention, there may be employed digital display means to display the count of the counting means.

Another advantageous feature of the invention is the use of means to sense the direction of movement of the measuring means and to control, in accordance with said direction, the direction of count of the aforesaid counting means. In other words, whether the counter will count upwards or downwards is determined by sensing the direction of movement of the measuring means.

Yet another advantageous feature of the invention is the provision of means for detecting when the measuring means is being withdrawn from its associated casing in a direction generally parallel to the above-mentioned horizontal line or, in the event that the measuring means is intended to be withdrawn vertical to the horizontal line, to determine that this direction is in fact being observed.

According to different embodiments of the invention, the aforementioned indicators may be openings constituting indications of measurements or they may be selectively arranged as coded indications of numbers. According to another embodiment, the measuring device may be a tape and, in accordance with yet another embodiment the measuring means may be a coil.

The above and other objects, features and advantages of the invention will be found in the following detailed description of some preferred embodiments as illustrated in the accompanying drawing.

BRIEF DESCRIPTION OF DRAWING

In the drawing:

FIG. 1 is a diagrammatic view illustrating the use of an instrument of the invention for determining slope;

FIG. 2 is an enlarged side view of the instrument illustrated in FIG. 1;

FIG. 3 is an enlarged scale view of the top of the instrument of FIGS. 1 and 2, illustrating the attachment of the sighting and leveling device;

FIG. 4 is a diagrammatic view illustrating the view seen through the sighting device illustrated in FIG. 3 and particularly illustrating the view of the bubbles which indicate levels;

FIG. 5 is a diagrammatic view illustrating the braking device employed in association with the measuring devices in the apparatus of FIGS. 1 and 2;

FIG. 6 is a diagrammatic view illustrating the attachment of the two casings employed in the apparatus of FIGS. 1 and 2;

FIG. 7 is a diagrammatic view illustrating how the unwinding of the measuring devices in the instruments of FIGS. 1 and 2 are controlled by triggers;

FIG. 8 is a diagrammatic view illustrating the electronic circuits employed in the apparatus of FIGS. 1 and 2 and particularly indicating circuits for the counting of linear measuring units and for the determination of the deviation of the measuring device from its normal path of discharge;

FIG. 9 illustrates a circuit employed in conjunction with the circuit of FIG. 8 for determining in which direction the counter in the circuit of FIG. 8 should count;

FIG. 10 is a fragmentary view of a measuring tape illustrating indicators employed in accordance with the invention;

FIG. 11 indicates a measuring cord employed with a further embodiment of the invention bearing indicators thereon; and FIG. 12 is a fragmentary view of a measuring tape illustrating another type of indicator employed in accordance with the invention.

DETAILED DESCRIPTION

In FIG. 1, an incline or slope is indicated at 20. This incline or slope may be in terrain being surveyed or may be part of a construction or the like, the angle of slope of which is to be measured. A reference point is indicated at 22 and is in the form of a block or the like which is installed with an index thereon at the higher of two related measuring points, the second point being indicated generally at 24.

The instrument of the invention is a slope indicating instrument and is generally indicated at 26. This instrument is capable of measuring simple linear measurements such as length, width or height independently of one another and thus the scope of the invention is not limited to a mere determination of grade or slope or the like.

Extending from the instrument 26 is a horizontal measuring tape 28 the purpose of which is to determine the horizontal distance between points 24 and 22 according to the horizontal vector of the slope. At the free end 30 of the tape 28 is a pivot 32 which can make a point-like engagement with the index on block 22 for purposes of accuracy of measurement.

Also extending from the instrument 26 is a vertical measuring tape 34 terminating in a foot-like attachment 36 by which engagement is made with the ground at point 24. Tape 34 is intended to measure the height of the point 22 relative to the point 24 in accordance with the vertical vector of the distance between such points.

The tapes 28 and 34 may also be seen in FIG. 2 wherein the instrument 26 is shown on enlarged scale. Therein it can be seen that the instrument more particularly consists of two casings 38 and 40 connected along a plane 42 and held together by means of a handle 44 received in sockets 46 and 48, respectively, mounted on casings 38 and 40. Lock nuts can be provided to hold the handle 44 in position in the two sockets or any other conventional means may be employed for holding the handle in position.

Also to be seen in FIG. 2 are two triggers 50 and 52. The purpose of these two triggers is to provide respectively for the release of tapes 28 and 34 so that the two tapes may be withdrawn from the respective casings in their respective desired directions of discharge. Additionally the tapes can be provided with a spring-loaded recoil if such feature is desired whereby the rewinding of the measuring tapes into the respective casings may be controlled by triggers 50 and 52.

Controls 54 and 56 are pivoted at 58 and 60 respectively for pivoting movement in the direction indicated by arrows 62 and 64, respectively. These controls control friction brakes as will be explained hereinafter to lock the tapes 28 and 34 against movement to preserve the measurements indicated by these tapes when required.

On the side of each of the casings 38 and 40 are located displays. For example, on casing 38 are provided displays 66 and 68 whereas on casings 40 is provided a display 70. Display 66 is intended to be a display in linear units of the measurements measured by tape 28. Display 70 is intended to be a display of the measurements in linear units measured by the tape 34. Display 68 is intended to be the slope ratio or grade which is the measurement indicated by display 66 divided by the measurement indicated by display 70. The measurement units can be in any desired scale such as feet and inches or centimeters and meters or the like. Additionally, the units indicated by the various displays may be arbitrary units if only the grade or slope ratio is essential.

Also illustrated in FIG. 2 is a holder 72 which is attached to the uppermost casing 38. This holder is intended to affix the sighting device to the casings 38 and 34 and to maintain them in such relative positions that the measurements taken by tapes 28 and 34 are accurate and of value. The holder 72 may be a U-shaped holder constructed of spring steel or the like and may be provided with locking devices such as bolts or latches and the like. The important characteristic of the holder is that it hold the sighting device in fixed predetermined relationship to the casings 38 and 40 so that measurements taken will be valid.

FIG. 3 illustrates the sighting device 74 held in position in the holder 72. The sighting device may be a conventional sighting device such as Model 55 made by Berger Instruments of Boston, Massachusetts. This conventional sighting device is commercially available provided with a single level internally mounted therein. The preferred sighting device employed in accordance with the invention will have two level devices arranged at right angles to one another.

More particularly, the sighting device will be provided with a lens holder 76 and a lens holder 78 through the cooperative use of which a sight may be taken on the particular point with respect to which measurements are to be taken. The sighting device will have the perpendicularly related levels indicated at 82 and 83. Shown in hidden lines is a reflection mirror 84 by means of which the field to be discussed hereinafter is seen.

The sighting device of the invention also has connected thereto a periscope attachment 86 having an eyepiece 88. The periscope device 86 is provided with a mirror 90 by means of which the field can be seen through the eyepiece 88 by viewing the same vertically downwards for purposes of convenience.

FIG. 4 illustrates the field to be seen through the eye-piece 88 and therein are reflected the levels 82 and 84 with the bubbles 92 and 94. These bubbles when appropriately centered on the center index line 96 will reveal that the sighting device is appropriately located in a horizontal plane having a horizontal line of vision and indicating that the casings 38 and 34 are in a vertical plane whereby the measuring tape 34 may also be withdrawn in a vertical direction as is required for appropriate and valid measurements as will be seen in greater detail hereinafter.

FIG. 5 illustrates diagrammatically and on enlarged scale the tape 28 passing between a fixed buffer 98 and a brake or eccentric 100 pivoting about pivot 58 mentioned hereinabove. The eccentric 100 pivots between the two indicated positions in the latter of which the tape 28 is sandwiched against buffer 98 and held in fixed position against movement in a braking operation which preserves the measurements then being indicated by the tape 28.

FIG. 6 indicates diagrammatically that the casings 38 and 40 are on the facing exteriors thereof provided with mating projections and grooves such as indicated at 102 and 104, the grooves being in a dove-tail shape for firmly holding the casings to one another in fixed relative attitudes. By use of this firm attachment, the casings 38 and 40 will have a fixed relationship to one another and, since they have a fixed relationship to the sighting device 74, it will be clear that there is now a firm reference for movement of the measuring tapes 28 and 34.

FIG. 7 illustrates by way of example that the tape 28 is part of a coiled measuring tape which can be selectively uncoiled and withdrawn from the associated casing or recoiled and retracted into the casing as required.

The coiled tape 28 may be wound around a shaft 106 which may be spring loaded by a coil spring (not shown) or which may be a freely rotatable shaft as desired. Fixed to the shaft 106 is a sprocket 108 having teeth 110 between which engages a catch 112 mounted on a lever 114 pivoted at 116. Extending to the other side of pivot 116 is lever arm 118 which is connected via intermediate levers to the trigger 50 mentioned hereinabove with respect to FIG. 2. When the catch 112 is in a position of interference with the teeth 110, shaft 106 is locked against rotation and tape 28 cannot be withdrawn from the casing. When the catch 112 is pivoted on lever 114 outwardly from a position of interference with teeth 110, the shaft 106 is free to pivot and the tape 28 can be withdrawn from the casing for purposes of measurement. Similarly, if the shaft 106 is spring-loaded, the trigger mentioned above will control whether the tape is recoiled on the shaft 106 or retracted into the casing or not.

FIG. 8 illustrates the counting and direction determining circuitry employed in accordance with the invention whereby the attitude of the measuring tape relative to the associated casing and the display of a linear unit count can be effected. More particularly illustrated in FIG. 8 is the measuring tape 28. However, with respect to the circuitry it should be pointed out that this is, in particular, diagrammatically illustrated as are the mechanical sensors, which are shown in the drawing in a form as to indicate clearly the function to be performed and generally how this is to be achieved.

It will be noted that the tape 28 is provided with a plurality of indicators such as seen for example at 120. The nature and form of these indicators will be described in greater detail hereinafter but for the present it is sufficient to realize that these indicators are merely indications of linear measuring units otherwise displayed on the tape, the indicators 20 being for purposes of detection and for use in the counting and display circuitry indicated generally at 122.

More particularly the apparatus is provided with feelers 124 and 126 capable of, for example, making contact through the holes 120 whereby, in conjunction with the voltage source or battery 128, signals are generated to indicate the count. The signals are passed through a differentiating circuit 128 and thence to a one-shot multivibrator 130 and thence to a counter 132. The differentiating circuit, as is well known, functions to detect signal changes which are fed into the one-shot multivibrator circuit 130 to generate pulses which are counted by the counter 132. Whether the counter counts upwardly in ascending order or downwardly in descending order is determined by control signals applied through add and subtract terminals 134 and 136. This is in turn determined by whether the tape 28 is being uncoiled and fed out of the casing or recoiled and retracted into the casing in order that the proper count be appropriately ascertained and displayed. The count in the counter 132 is fed to the display 138 where it is made visible through displays 66, 68 and 70 as referred to hereinabove with respect to FIG. 2. However, for purposes of providing a second count there is employed a counter 140 associated with casing 40 and a dividing circuit 142 connected to counters 132 and 134 via lines 144 and 146. The dividing circuit 142 functions to provide the ratio between the horizontal and vertical count as has been mentioned hereinabove, this result being fed via line 148 to display 138 as mentioned hereinabove.

Counter circuits as well as differentiating circuits and one-shot multivibrator circuits are well known. However, by way of example and for purposes of indicating how these can be employed according to current state of the art, mention is made of the National Semiconductor CMOS Chips MM74C925; MM74C926; MM74C927; or MM74C928. For the display, there may, for example, be employed an L.E.D. display such as Lightronix, Inc. Type 5082 which is a seven segment L.E.D. display. Reference is also made for the counter and digital display to the arrangement shown in U.S. Pat. No. 4,097,725.

Thus, it will be understood, as the tape is withdrawn from the casing, the indicators 120 are sequentially withdrawn from between the feelers 124 and 126 whereby a through contact is made thereby completing the circuit and applying signals to the differentiating circuit 128 which as aforesaid will operate through the one-shot multivibrator to provide signals to the counter 132 or the counter 140 for purposes of display by the display 138.

The tape, it will be noted, is fed through fixed references 150 and 152 constituted by separate blocks or by a single block provided with an aperture suitable for the passage of the tape 28. It is to be understood that the references 150 and 152 constitute the reference for movement of the tape 28 from the associated casing 38 (FIG. 2).

Also fixed relative to references 150 and 152 are feelers 154, 156, 158 and 160. Feelers 154 and 156 are spaced sufficiently to pass tape 28 therebetween while making contact with the same. Assuming that tape 28 is made of a conductive material, feelers 154 and 156 which are spring-loaded and therefore maintain a constant pressure against the opposite sides of tape 28, will make electrical contact therewith. On the other hand, feelers 158 and 160 are spaced apart and not intended to make contact with tape 28. The spacing between the feelers 158 and 160 and the tape 28 may be at a maximum one or two millimeters. Thus normally no contact is made between the tape 28 and the feelers 158 and 160 unless the tape 28 is diverted from its normal path of intended movement along a horizontal line. In such event the tape 28 will make contact with one or the other of feelers 158 and 160 and a circuit will be completed through battery 162 and alarm 164 whereby the deviation of tape 28 from its normal path of movement will be indicated by the alarm 164. The alarm 164 may be a visual alarm such as a light on the casing 38 or may alternatively be a buzzer and thus provide an audible alarm. The purpose, however, is to indicate merely that the tape and casing and therefore the sight 74 are not in appropriate alignment so that the measurements at such time may be invalid. Accordingly, adjustment of the casing is essential before the reading on the associated display may be considered to be valid.

Also indicated in FIG. 8 is the sensor 166. The purpose of the sensor 166 is to determine whether the tape 28 is moving in one direction or the other as indicated by double-headed arrow 167. The purpose of this sensing is to provide an appropriate signal A and S to counter 132 to control the direction of its count.

FIG. 9 indicates the sensor 166 in greater diagrammatic detail. Therein it can be seen that a roller 168 is mounted on a freely rotating shaft 170 on which are mounted voltage generators 172 and 174. Attached to these generators are respective diodes 176 and 178, these feeding into flip-flops 180 and 182 capable of generating signals S or A at terminals 184 and 186, respectively. These signals as indicated hereinabove are fed to the counter 132 and, in known manner, correct whether the count is an ascending or descending count according to well known techniques developed in the state of the art. Thus, it will appear that the rotation of the roller 168 in one direction or the other will determine which signal S or A is generated and what the nature of the count in counter 132 will be.

FIG. 10 illustrates a simple arrangement of indicators in the tape 28 as might be employed in accordance with the invention. Thus, in spatial correlation with the inch printed indications are holes 190, 192, etc., these being offset from the actual markings which they indicate to account for the distance between feelers 124, 126 (FIG. 8) and the actual position of the associated printed indications. The indicators 190, 192 may be simple openings which are detected by appropriate feelers as diagrammatically indicated hereinabove. As an alternative these indicators may be appropriate dielectrics to be picked up by capacitance detectors or magnetic indicators to be magnetically detected. Photoelectric detection techniques may also be employed in accordance with the embodiment of FIG. 10.

In the embodiment of FIG. 10, the coiled measuring device is a tape fabricated for example of metal for reasons stated hereinabove or also possibly fabricated of nylon, plastic or the like. FIG. 11 indicates that it is not always necessary to use a tape and that instead there may be substituted a nylon cord or the like as indicated at 193. Thereon may be provided indicators 194 which may be in the form of metal foil or other indicators such as, magnetic, reflective, conductive, nonnconductive or the like, all of which may be employed in association with known detection techniques for applying pulses to a counter for purposes of counting the same.

It is not however necessary to limit the invention to the provision of simple indicators since, as illustrated in FIG. 12, coded combinations of indicators may be employed as shown at 196. For purposes of illustration and not by way of limitation, dots may be arranged transversely of a tape according to the binary code to occupy or not different orders of significance as is well known in the digital computer art. The coded combinations of indicators may be read directly and displayed directly rather than having to go through the intermediary of a counter and thereby an appropriate indication can be given of the measurement on the related tape with this indication being appropriately displayed at displays 66 and 70 with the resultant ratio being displayed at the display 68.

From what has been stated hereinabove, it will now appear that, in accordance with the invention, there is provided a measuring apparatus comprising a casing having a coil measuring means therein and adapted for being selectively uncoiled and withdrawn from the casing and recoiled or retracted into the casing with sighting means being detachably mounted on the casing to sight a target, said sighting means including lever means for determining when said sighting means is sighting along a horizontal line.

It will be also appreciated that within the scope of the invention there are provided two casings held together in rigorously related attitude and associated with a sighting device and arranged for the discharge of a measuring tape or cord or the like in perpendicularly related directions appropriately related to the horizontal and vertical by means of the leveling devices provided in the sighting device employed in accordance with the invention.

Since the tapes or cords are flexible and capable of deviation from a normal path of discharge from the related casing, there is provided, in accordance with the invention, means for sensing such a deviation and therefore for determining when the measuring devices are appropriately related to the casings. There is also provided according to the invention a display and counting apparatus or circuitry for ascertaining the count of the linear measuring units on the tapes whereby a convenient display is possible in accordance with the teachings of the invention. However, it will be readily appreciated that it is possible to print the measuring units on the tape directly and to display these directly thereby obviating the need for the counting apparatus of the invention even though such counting apparatus is preferred.

In further accordance with the invention there is provided a sensing device for determining in which of two directions the measuring device is moving relative to the related casing whereby appropriate signals can be supplied to associated counting mechanisms to determine whether the count therein is to be in ascending or descending order.

Further there are provided triggers and other related brakes and mechanisms which afford convenient usage of the apparatus of the invention for purposes of determining slope or grade or the individual measurements which are related thereto.

In the aforegoing construction (see FIG. 2), it is possible to mount the device on a tripod indicated generally at 41 including perpendicularly related levels 43 and 45 and adjustably related plates 47 and 49 with lockable adjustment screws 51, 53, 55 and another which is hidden, plate 47 being rotatable. This enables levelling of the device as previously described.

There will now be obvious to those skilled in the art many modifications and variations of the structures and circuitry set forth hereinabove. These modifications and variations will not depart from the scope of the invention if defined by the following claims.

What is claimed is:

1. Measuring apparatus comprising a casing, a coiled measuring means within said casing and adapted for being selectively uncoiled and withdrawn from said casing and recoiled and retracted into said casing, sighting means on said casing to sight a target, said sighting means including level means for determining when said sighting means is sighting along a horizontal line, and a second coiled measuring means operatively associated with the first of said coiled measuring means and adapted for being uncoiled and recoiled in a direction generally perpendicular to that of the first said coiled measuring means, said sighting means including level means for indicating level along a line perpendicular to said horizontal line to establish a reference for said second measuring means.

2. Measuring apparatus as claimed in claim 1 comprising means for detachably connecting said sighting means to said casing.

3. Measuring apparatus as claimed in claim 1 comprising trigger means for releasing said coiled measuring means so that the measuring means can be uncoiled.

4. Measuring apparatus as claimed in claim 1 comprising periscope means on said sighting means whereby the sighting means can be viewed by looking vertically downwards.

5. Measuring apparatus as claimed in claim 1 comprising braking means for locking said measuring means against withdrawal.

6. Measuring apparatus as claimed in claim 1 comprising a casing for said second coiled measuring means, and means for engaging said casings for supporting said coiled measuring means for rotation about spaced and parallel axes and for releasing said measuring means in generally perpendicular directions.

7. Measuring apparatus as claimed in claim 1 comprising measuring unit indicators on said measuring means and counting means to count said indicators.

8. Measuring apparatus as claimed in claim 7 comprising digital display means to display the count of said counting means.

9. Measuring apparatus as claimed in claim 1 comprising means for detecting when the measuring means is being withdrawn from the casing in a direction generally parallel to said horizontal line.

10. Measuring apparatus as claimed in claim 8 comprising means to engage and sense the direction of movement of the measuring means and to control, in accordance with said direction, the direction of count of said counting means.

11. Measuring apparatus as claimed in claim 10 comprising trigger means for releasing said coiled measuring means so that the measuring means can be uncoiled.

12. Measuring apparatus as claimed in claim 11 comprising periscope means on said sighting means whereby the sighting means can be viewed by looking vertically downwards.

13. Measuring apparatus as claimed in claim 12 comprising braking means for locking said measuring means against withdrawal.

14. Measuring apparatus as claimed in claim 13 comprising means for detachably connecting said sighting means to the first said casing.

15. Measuring apparatus as claimed in claim 7 wherein said counting means includes differentiation means to produce pulses, one-shot multivibrator means to produce signals in response to said pulses, and a counter circuit to count said signals.

16. Measuring apparatus as claimed in claim 7 wherein the indicators are equally spaced position indications on the measuring means.

17. Measuring apparatus as claimed in claim 7 wherein the indicators are arranged as coded indications of numbers.

18. Measuring apparatus as claimed in claim 1 wherein the measuring means is a tape.

19. Measuring apparatus as claimed in claim 1 wherein the measuring means is a cord.

* * * * *

UNITED STATES PATENT AND TRADEMARK OFFICE
CERTIFICATE OF CORRECTION

PATENT NO. : 4,274,203
DATED : June 23, 1981
INVENTOR(S) : Vasile

It is certified that error appears in the above–identified patent and that said Letters Patent are hereby corrected as shown below:

Column 1, line 33: change "tripode" to --tripod--
          line 35: change "has" to --have--

Column 2, line 35: delete "the"
          line 61: change "is" to --in--

Signed and Sealed this

Second Day of February 1982

[SEAL]

Attest:

GERALD J. MOSSINGHOFF

Attesting Officer     Commissioner of Patents and Trademarks